United States Patent
Ohtani et al.

(10) Patent No.: US 8,018,195 B2
(45) Date of Patent: Sep. 13, 2011

(54) AC MOTOR DRIVE CONTROL DEVICE AND METHOD

(75) Inventors: Hiroki Ohtani, Aichi-ken (JP); Makoto Nakamura, Okazaki (JP); Kenji Yamada, Toyota (JP); Masaki Okamura, Toyota (JP); Hideto Hanada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 455 days.

(21) Appl. No.: 12/305,713

(22) PCT Filed: Mar. 27, 2007

(86) PCT No.: PCT/JP2007/057340
§ 371 (c)(1),
(2), (4) Date: Dec. 19, 2008

(87) PCT Pub. No.: WO2008/001524
PCT Pub. Date: Jan. 3, 2008

(65) Prior Publication Data
US 2010/0231151 A1     Sep. 16, 2010

(30) Foreign Application Priority Data
Jun. 30, 2006   (JP) ................. 2006-181802

(51) Int. Cl.
*H02P 3/18*    (2006.01)
*H02P 25/00*   (2006.01)
*H02P 27/00*   (2006.01)

(52) U.S. Cl. ............. 318/812; 318/432; 318/400.02; 318/400.07; 318/400.09; 318/139

(58) Field of Classification Search ............ 318/812, 318/432, 139, 400.02, 400.07, 400.09
See application file for complete search history.

(56) References Cited

U.S. PATENT DOCUMENTS

| 5,657,216 A | 8/1997 | Kaura |
| 6,023,417 A * | 2/2000 | Hava et al. .............. 363/41 |
| 7,911,177 B2 * | 3/2011 | Ohtani et al. ............ 318/811 |
| 2011/0006598 A1 * | 1/2011 | Yamakawa et al. ........ 307/9.1 |

FOREIGN PATENT DOCUMENTS

| EP | 0 597 132 A1 | 5/1994 |
| EP | 0 808 016 A1 | 11/1997 |
| JP | 2001-078495 | 3/2001 |

* cited by examiner

*Primary Examiner* — Bentsu Ro
*Assistant Examiner* — Erick Glass
(74) *Attorney, Agent, or Firm* — Kenyon & Kenyon LLP

(57) ABSTRACT

An AC motor drive control device includes a control mode judgment unit that performs a judgment based on required voltage amplitude required by a synchronous AC motor, in order to switch units for applying voltage to the AC motor to one of a rectangular wave voltage phase control unit, an overmodulation control unit, and a PWM current control unit.

11 Claims, 9 Drawing Sheets

AC MOTOR DRIVE CONTROL DEVICE AND METHOD

This is a 371 national phase application of PCT/JP2007/057340 filed 27 Mar. 2007, claiming priority to Japanese Patent Application No. JP 2006-181802 filed 30 Jun. 2006, the contents of which are incorporated herein by reference.

TECHNICAL FIELD

The present invention relates to a drive control device and method that enable further stabilized control of an alternating-current (AC) motor.

BACKGROUND ART

In order to drive an AC motor by means of a direct-current power source, a drive method using an inverter is commonly employed. Typically, the inverter is subjected to switching control by an inverter drive circuit, and, for example, a pulse width modulation (PWM) waveform voltage is applied to the AC motor.

There has been known a method for supplying power to an AC motor by selectively switching, by means of switches, among PWM current control, mode, overmodulation control mode, and rectangular wave voltage phase control mode. When the voltage amplitude exceeds the peak value of a reference triangle wave, the control mode is switched from the PWM current control mode to the overmodulation control mode. Further, when the voltage amplitude exceeds a value obtained by multiplying the peak value of the reference triangle wave by 1.27, the control mode is switched from the overmodulation control mode to the rectangular wave voltage phase control mode. On the other hand, when the absolute value of the actual current phase becomes less than the absolute value of the current command phase, the control mode is switched from the rectangular wave voltage phase control mode to the overmodulation control mode. When the voltage amplitude becomes less than the peak value of the reference triangle wave, the control mode is switched from the overmodulation control mode to the PWM current control mode.

According to the above method, in order to eliminate the influences of periodic noise and higher harmonic waves included in the d-axis current and the q-axis current, a value obtained by performing low-pass filter processing with respect to a measured current value is used as the pseudo actual current value for calculating the actual current phase. However, in cases in which the low-pass filter processing is performed, an undesirable situation is caused at a point when the torque command value is suddenly reduced. That is, during comparison of the absolute value of the current command phase and the absolute value of the actual current phase, the actual current phase calculated based on the pseudo actual current value subjected to the filter processing (shown by dotted line A in FIG. 11) becomes significantly deviated from the real actual current phase obtained from the original actual current (shown by bold line B in FIG. 11), as illustrated by the Lissajous curves of d-axis current and q-axis current shown in FIG. 11. As a result, when the switching from the rectangular wave voltage phase control mode to the overmodulation control mode is performed at the point (point a in FIG. 11) when the absolute value of the actual current phase calculated based on the current subjected to the filter processing becomes smaller than the absolute value of the current command phase (shown by thin line C in FIG. 11), the switching of the control mode from the rectangular wave voltage phase control mode to the overmodulation control mode is in fact effected at the point (point b in FIG. 11) when the actual current phase is deviated from the current command phase by an amount corresponding to the time constant of the low-pass filter. This type of delay in the switching of control modes generates undesirable hunting (vibrations) or the like in the current phases, possibly resulting in unstable control.

DISCLOSURE OF THE INVENTION

The present invention addresses the above problems, and is directed to providing a method and device for achieving stable drive control of an AC motor.

According to one aspect of the present invention, there is provided an AC motor drive control device comprising a synchronous AC motor, an inverter, an overmodulation control unit that applies, via the inverter to the synchronous AC motor, a PWM (pulse width modulation) voltage which has a predetermined voltage amplitude and predetermined phase according to a torque command and in which the voltage amplitude exceeds a peak value of a reference triangle wave, a rectangular wave voltage phase control unit that controls a phase of a rectangular wave voltage which provides output of one pulse every half a period of an output voltage fundamental wave according to a torque command, and applies the controlled rectangular wave voltage via the inverter to the synchronous AC motor, a voltage amplitude calculator that calculates an amplitude of a voltage applied to the synchronous AC motor, a required voltage amplitude calculator that calculates a required voltage amplitude required by the synchronous AC motor, and a control mode judgment unit that performs a judgment to switch the unit for applying voltage to the synchronous AC motor from the rectangular wave voltage phase control unit to the overmodulation control unit when the required voltage amplitude becomes less than a value obtained by multiplying the peak value of the reference triangle wave by 1.27.

BEST MODE FOR CARRYING OUT THE INVENTION

Figure 1:
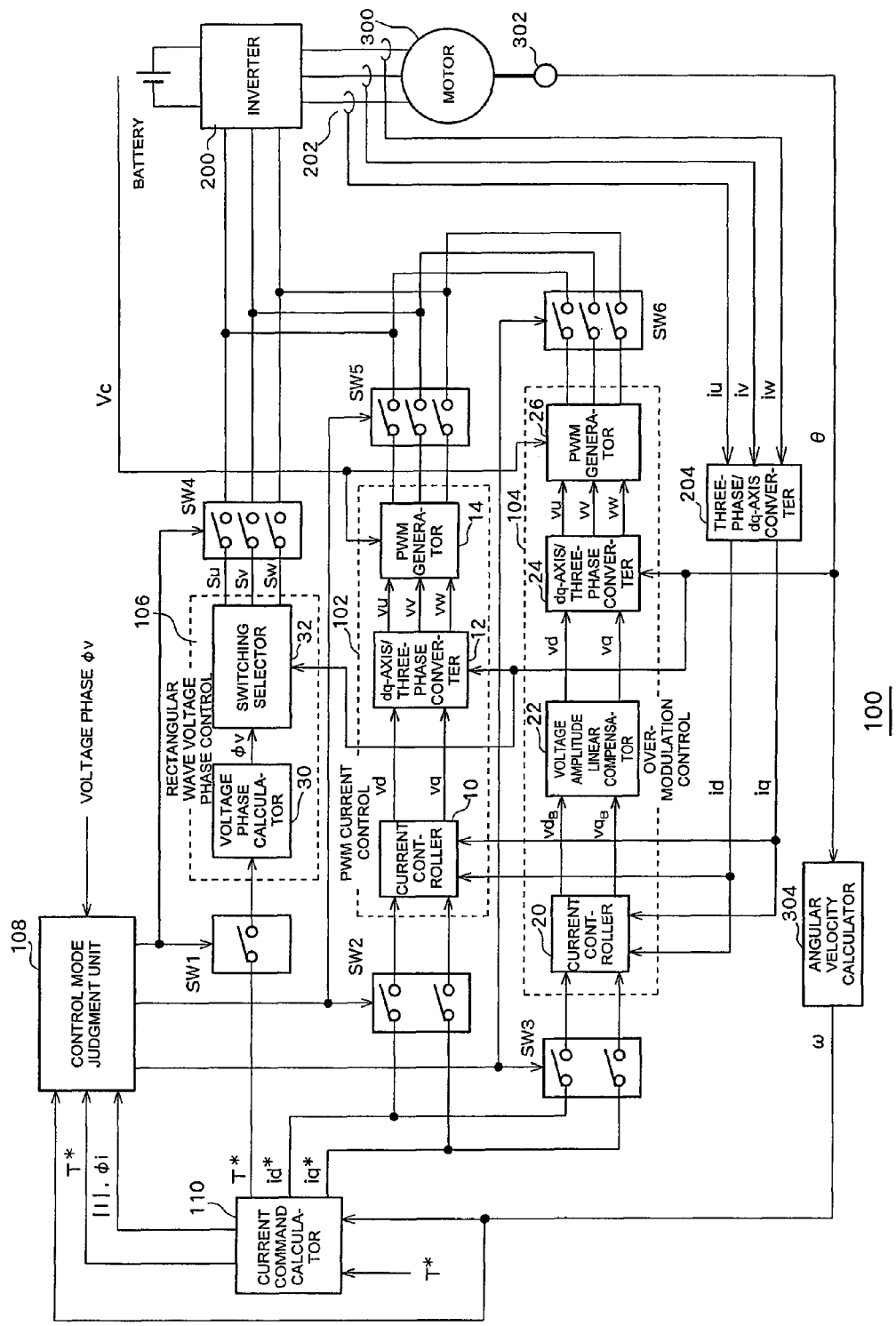
FIG. 1 is a block diagram showing a configuration of an AC motor drive control device according to an embodiment of the present invention.

An AC motor drive control device 100 according to an embodiment of the present invention is configured as shown in FIG. 1 including a PWM current control unit 102, overmodulation control unit 104, rectangular wave voltage phase control unit 106, control mode judgment unit 108, and current command calculator 110. The drive control device 100 is connected to an AC motor 300 via an inverter 200, and controls drive of the AC motor 300 by supplying three-phase electric power to the inverter 200 from one of the PWM current control unit 102, the overmodulation control unit 104, or the rectangular wave voltage phase control unit 106.

Figure 2A:
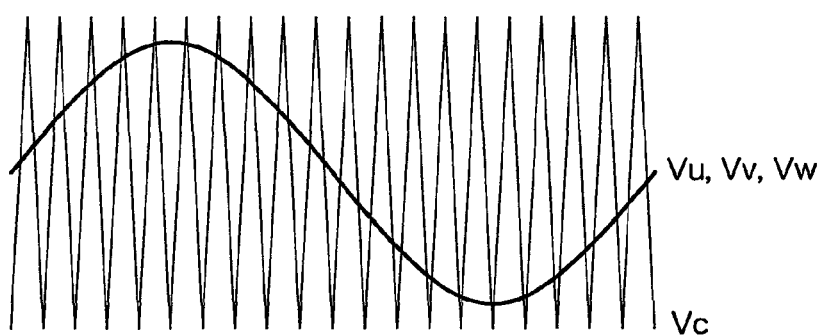
FIGS. 2A and 2B are diagrams for explaining the modulation processing performed in a PWM current control unit in the embodiment of the present invention.
Figure 2B:
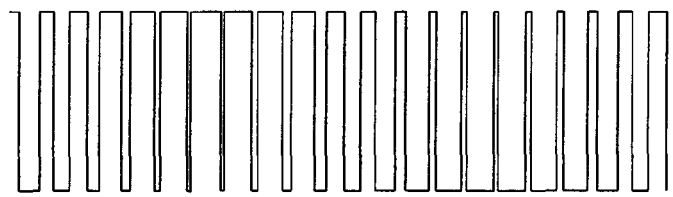

The PWM current control unit 102 functions when switch SW2 and switch SW5 are in the ON state. In the PWM current control unit 102, a current controller 10 receives, via switch SW2, input of resulting values obtained by detecting values of AC current outputs from the inverter 200 using current sensors 202 and performing processing for converting the detected values into d-axis current value id and q-axis current value iq using a three-phase/dq-axis converter 204. Further, the current controller 10 receives input of d-axis current command value id* and q-axis current command value iq* which are calculated in the current command calculator 110 based on the torque command value T* and the angular velocity ω of the AC motor 300. The current controller 10 controls d-axis voltage vd and q-axis voltage vq in order for d-axis current value id and q-axis current value iq to approach closer to d-axis current command value id* and q-axis current command value iq*, respectively. The d-axis voltage vd and q-axis voltage vq are supplied from the current controller 10 to a dq-axis/three-phase converter 12. The dq-axis/three-phase converter 12 converts these voltages into three-phase voltage vu, vv, vw by employing, as a reference, the rotational position (rotational angle) θ of the rotor of the AC motor 300 detected by a resolver 302 provided in the AC motor 300, and outputs the obtained three-phase voltage to a PWM generator 14. The PWM generator 14 compares the three-phase voltage vu, vv, vw with triangle wave Vc as shown in FIG. 2A, so as to generate a switching command having pulse widths corresponding to the amplitude of the three-phase voltage vu, vv, vw as shown in FIG. 2B. The switching command is supplied to the inverter 200 via switch SW5.

Figure 3A:
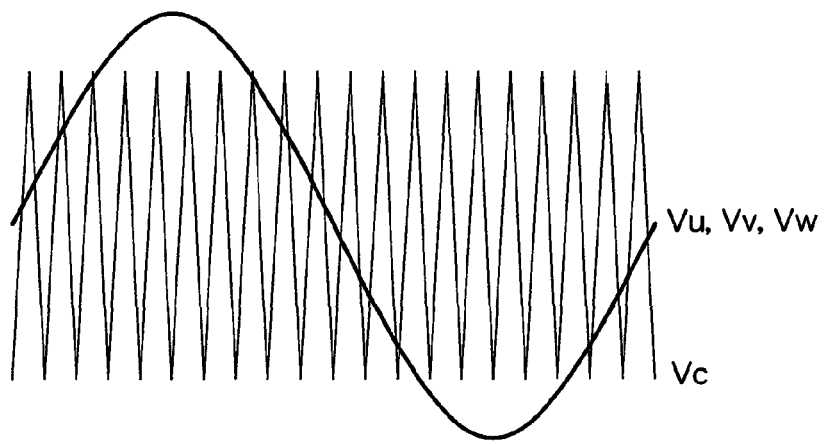
FIGS. 3A and 3B are diagrams for explaining the modulation processing performed in an overmodulation control unit in the embodiment of the present invention.
Figure 3B:
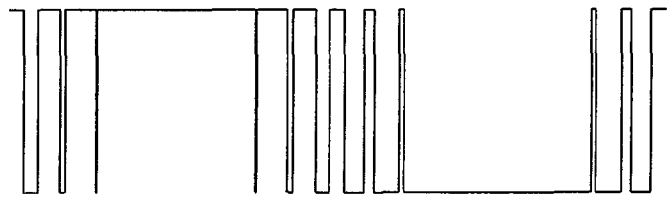

The overmodulation control unit 104 functions when switch SW3 and switch SW6 are in the ON state. In the overmodulation control unit 104, a current controller 20 receives, via switch SW3, input of d-axis current value id and q-axis current value iq from the three-phase/dq-axis converter 204. Further, the current controller 20 receives input of d-axis current command value id* and q-axis current command value iq* which are calculated in the current command calculator 110. The current controller 20 controls uncompensated d-axis voltage $vd_B$ and q-axis voltage $vq_B$ in order for d-axis current value id and q-axis current value iq to approach closer to d-axis current command value id* and q-axis current command value iq*, respectively. The d-axis voltage $vd_B$ and q-axis voltage $vq_B$ before compensation are supplied to a voltage amplitude linear compensator 22. The voltage amplitude linear compensator 22 compensates the voltage values of d-axis voltage $vd_B$ and q-axis voltage $vq_B$ so as to output linearly-compensated d-axis voltage vd and q-axis voltage vq. The d-axis voltage vd and q-axis voltage vq are supplied from the voltage amplitude linear compensator 22 to a dq-axis/three-phase converter 24. The dq-axis/three-phase converter 24 converts these voltages into three-phase voltage vu, vv, vw by employing, as a reference, the rotational position (rotational angle) θ input from the resolver 302, and outputs the obtained three-phase voltage to a PWM generator 26. The PWM generator 26 compares the three-phase voltage vu, vv, vw with the triangle wave Vc as shown in FIG. 3A, so as to generate a switching command having pulse widths corresponding to the amplitude of the three-phase voltage vu, vv, vw as shown in FIG. 3B. In the PWM generator 26, when the amplitude of the three-phase voltage vu, vv, vw is greater than the peak value of the triangle wave Vc serving as the reference, the switching command is generated having a pulse width longer than the period of the triangle wave Vc (this is referred to as the overmodulation mode). The generated switching command is supplied to the inverter 200 via switch SW6.

Figure 4:
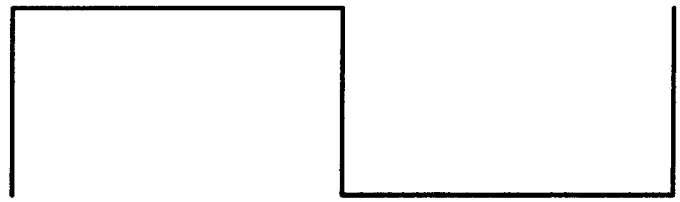
FIG. 4 is a diagram showing a rectangular wave voltage output from a rectangular wave voltage phase control unit in the embodiment of the present invention.

The rectangular wave voltage phase control unit 106 functions when switch SW1 and switch SW4 are in the ON state. In the rectangular wave voltage phase control unit 106, a voltage phase calculator 30 receives input of the torque command value T* from the current command calculator 110 via switch SW1, and generates and outputs voltage phase φv in accordance with torque deviation ΔT. This voltage phase φv is the phase of a rectangular wave applied to the AC motor 300. More specifically, the voltage phase calculator 30 employs, as parameters for generating the voltage phase φv, voltage Vdc of the direct current power source connected to the inverter 200 and the angular velocity ω of the AC motor in addition to the torque deviation ΔT, and substitutes these parameters into a predetermined calculation formula (or performs an equivalent processing) so as to generate the required voltage phase φv. The voltage phase φv is supplied from the voltage phase calculator 30 to a switching selector 32. In accordance with the voltage phase φv, the switching selector 32 controls the phase of rectangular wave voltage having voltage amplitude |V| determined by the power voltage Vdc of the direct current power source of the inverter 200, and outputs the obtained rectangular wave voltage as shown in FIG. 4. This rectangular wave voltage is applied to the inverter 200 via switch SW4.

The inverter 200 is configured including a voltage-type inverter circuit. The inverter 200 receives the switching command from the PWM current control unit 102, the switching command from overmodulation control unit 104, or the rectangular wave voltage from the rectangular wave voltage phase control unit 106, and generates a three-phase pseudo sinusoidal voltage. This pseudo sinusoidal voltage is applied to the AC motor 300.

The AC motor 300 is configured including a permanent magnet (PM) synchronous motor. The AC motor 300 receives the three-phase pseudo sinusoidal voltage from the inverter 200 to thereby rotate the rotor.

The current sensors 202 are provided on the power supply line from the inverter 200 to the AC motor 300. Current values iu, iv, iw corresponding to the respective phases are detected in real time by those sensors 202, and input into the three-phase/dq-axis converter 204. The three-phase/dq-axis converter 204 converts the current values iu, iv, iw into d-axis current value id and q-axis current value iq for subsequent output.

Further, the resolver 302 for detecting the rotational position (rotational angle) θ of the rotor is provided in the AC motor 300. The resolver 302 detects the rotational position (rotational angle) θ of the rotor of the AC motor 300, and outputs the detected value to the dq-axis/three-phase converters 12, 24 and an angular velocity calculator 304. Upon receipt of the rotational position (rotational angle) θ from the resolver 302, the angular velocity calculator 304 converts the received value into angular velocity ω of the rotor of the AC motor 300, and outputs the angular velocity ω to the current command calculator 110 and the control mode judgment unit 108.

In a case in which the drive control device 100 is applied to a drive system of a vehicle, for example, the current command calculator 110 receives input of the torque command value T* which is generated in an electronic control unit (ECU; not shown) in accordance with the throttle opening degree, brake pedal angle, and the like. The current command calculator 110 generates d-axis current command value id* and q-axis current command value iq* in accordance with the torque command value T* and the angular velocity ω. The d-axis current command value id* and q-axis current command value iq* are input into the current controller 10 of the PWM current control unit 102 when switch SW2 is in the ON state, and when switch SW3 is in the ON state, the values id* and iq* are input into the current controller 20 of the overmodulation control unit 104. Furthermore, when switch SW1 is in the ON state, the torque command value T* is supplied from the current command calculator 110 to the voltage phase calculator 30 of the rectangular wave voltage phase control unit.

The current command calculator 110 also calculates current amplitude absolute value |I| and current phase angle iφ of the d-axis current command value id* and the q-axis current command value iq* corresponding to the torque command value T* and the angular velocity ω. The calculated current amplitude absolute value |I| and current phase angle iφ of the current command values and the torque command value T* are input into the control mode judgment unit 108. The current amplitude absolute value |I| and the current phase angle iφ of the d-axis current command value id* and the q-axis current command value iq* can be calculated using equations (1) and (2) below.

$$|I| = \sqrt{Id^{*2} + Iq^{*2}} \quad (1)$$

$$\phi i = \tan^{-1}\left(\frac{iq^*}{id^*}\right) \quad (2)$$

The control mode judgment unit 108 receives input of the angular velocity ω, the torque command value T*, and the current amplitude absolute value |I| and current phase angle iφ of the current command values (or, alternatively, d-axis voltage value vd and q-axis voltage value vq, or uncompensated d-axis voltage value $vd_B$ and q-axis voltage value $vq_B$), and performs switching of the control modes of the AC motor 300 by controlling connection and disconnection of switches SW1-SW6. The control mode judgment unit 108 includes an input signal switching device for acquiring input of voltage phase φv from the voltage phase calculator 30 when switches SW1 and SW4 are in the ON state and the rectangular wave voltage phase control unit 106 is being selected, acquiring d-axis voltage vd and q-axis voltage vq from the current controller 10 when switches SW2 and SW5 are in the ON state and the PWM current control unit 102 is being selected, and acquiring d-axis voltage $vd_B$ and q-axis voltage $vq_B$ from the current controller 20 when switches SW3 and SW6 are in the ON state and the overmodulation control unit 104 is being selected.

Figure 5:
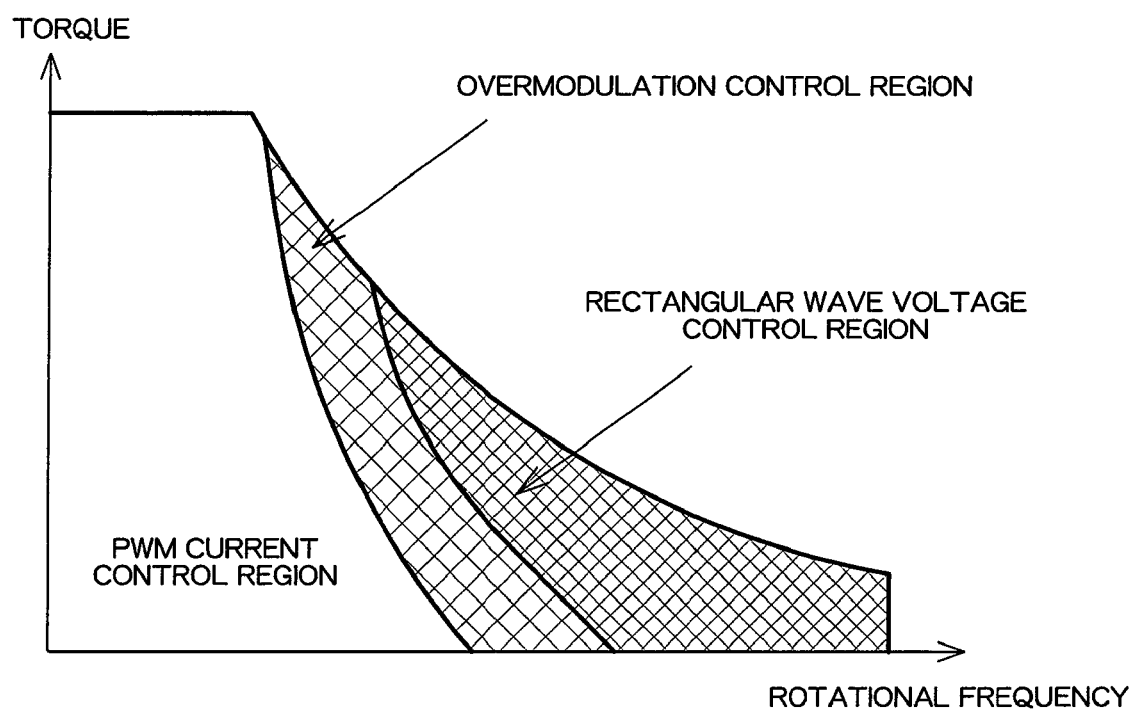
FIG. 5 is a diagram showing the relationship of the rotational frequency and torque of the AC motor with respect to the drive control modes according to the embodiment of the present invention.

The control modes of the AC motor 300 are switched in accordance with the rotational frequency and torque of the AC motor 300. In a preferred embodiment, as shown in FIG. 5, the PWM current control mode is selected when in a state in which the rotational frequency of the AC motor 300 is low and the output torque is large, and the control mode is shifted to the overmodulation control mode and to the rectangular wave voltage phase control mode as the rotational frequency is increased and the output torque is reduced.

Figure 6:
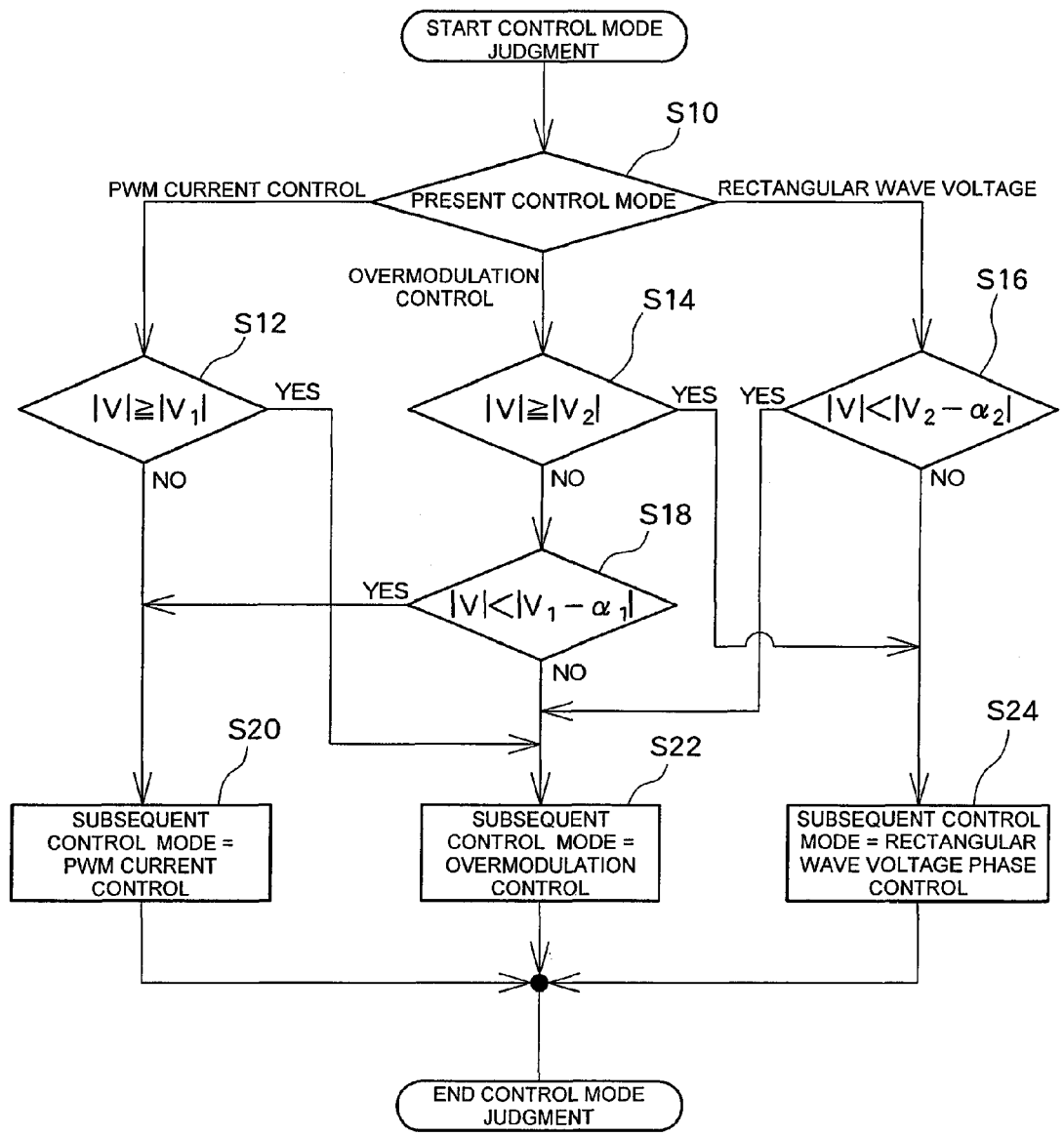
FIG. 6 is a flowchart illustrating the AC motor drive control according to the embodiment of the present invention.

According to the present embodiment, the control mode judgment unit 108 performs switching of the control modes of the drive control device 100 in accordance with the flowchart shown in FIG. 6. When the control is started, the present control mode is detected in step S10. When switches SW2 and SW5 are in the ON state and the PWM current control unit 102 is being selected, the processing proceeds to step S12. When switches SW3 and SW6 are in the ON state and the overmodulation control unit 104 is being selected, the processing proceeds to step S14. Further, when switches SW1 and SW4 are in the ON state and the rectangular wave voltage phase control unit 106 is being selected, the processing proceeds to step S16.

In step S12, judgment for switching the control modes is executed based on the absolute value $|V_R|$ of required voltage amplitude $V_R$ while using, as a reference, the absolute value $|Vc_P|$ of the peak value of the triangle wave voltage Vc applied to the PWM generators 14, 26. The required voltage amplitude $V_R$ can be calculated according to equation (3) below.

required voltage amplitude $V_R$=power P/(current amplitude |I|×power factor φ)   (3)

The current amplitude |I| can be obtained using equation (1), while the power P and power factor φ can be calculated according to equations (4) and (5) below.

$$P = \frac{T^*}{\omega} \quad (4)$$

$$\phi = \cos(\phi v - \phi i) \quad (5)$$

$$\text{where } \phi v = \tan^{-1}\left(\frac{vq^*}{vd^*}\right)$$

$$\phi i = \tan^{-1}\left(\frac{iq^*}{id^*}\right)$$

Figure 7:
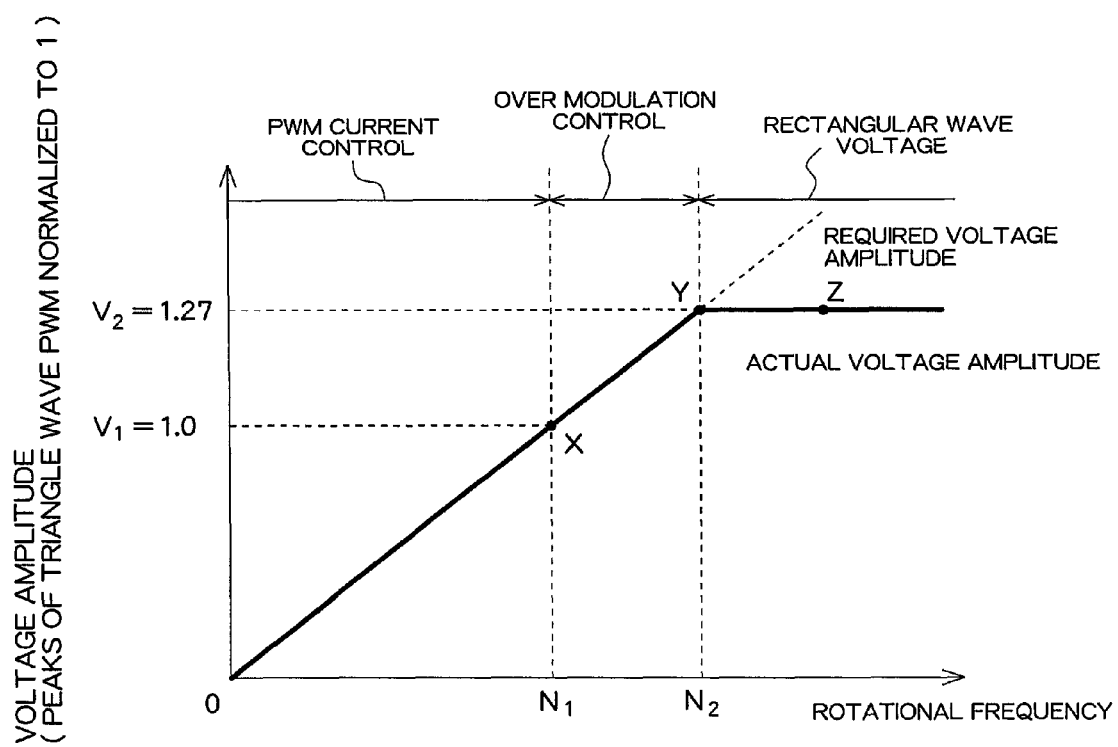
FIG. 7 is a diagram showing the relationship of the rotational frequency and voltage amplitude of the AC motor with respect to the drive control modes according to the embodiment of the present invention.

When sinusoidal modulation without including third-order harmonic components is performed in the PWM current control unit 102 and the overmodulation control unit 104, control threshold voltage $|V_1|$ is set to the absolute value $|Vc_P|$ of the peak value of the reference triangle wave voltage Vc. When the absolute value $|V_R|$ of the required voltage amplitude $V_R$ is less than the threshold voltage $|V_1|$, the processing proceeds to step S20, so as to maintain switches SW2 and SW5 in the ON state and switches SW1, SW3, SW4, and SW6 in the OFF state, such that the AC motor 300 continues to be controlled by the PWM current control unit 102. On the other hand, when the rotational frequency of the AC motor 300 is increased and the absolute value $|V_R|$ of the required voltage amplitude $V_R$ becomes greater than or equal to the threshold voltage $|V_1|$, the processing proceeds to step S22, so as to switch switches SW2 and SW5 to the OFF state, switch switches SW3 and SW6 to the ON state, and maintain switches SW1 and SW4 in the OFF state, such that the control of the AC motor 300 is transferred from the PWM current control unit 102 to the overmodulation control unit 104. In FIG. 7, rotational frequency is given by the horizontal axis, while voltage amplitude is given by the vertical axis.

When the processing proceeds to step S14, judgment for switching the control modes is executed similarly based on the absolute value $|V_R|$ of required voltage amplitude $V_R$ while using, as a reference, the absolute value $|Vc_P|$ of the peak value of the triangle wave voltage Vc applied to the PWM generators 14, 26. However, in this step, control threshold voltage $|V_2|$ serving as the criterion value based on which the judgment is made is set to a value obtained by multiplying 1.27 ($\pi/4$) to the absolute value $|Vc_P|$ of the peak value of the reference triangle wave voltage Vc.

In step S14, when the absolute value $|V_R|$ of the required voltage amplitude $V_R$ is less than the threshold voltage $|V_2|$, the processing proceeds to step S18, and when the absolute value $|V_R|$ of the required voltage amplitude $V_R$ is greater than or equal to the threshold voltage $|V_2|$, the processing proceeds to step S24. In step S18, when the absolute value $|V_R|$ of the required voltage amplitude $V_R$ is less than threshold voltage $|V_1-\alpha_1|$, the processing proceeds to step S20, and when the absolute value $|V_R|$ of the required voltage amplitude $V_R$ is greater than or equal to the threshold voltage $|V_1-\alpha_1|$, the processing proceeds to step S22. Here, $\alpha_1$ is an offset voltage value having a positive value, and is used to provide a difference between the threshold voltage for transferring from the PWM current control mode to the overmodulation control mode and the threshold voltage for transferring from the overmodulation control mode to the PWM current control mode, in order to prevent chattering in the control of the AC motor 300 around the threshold voltage $|V_1|$ between the PWM current control mode and the overmodulation control mode. For example, $\alpha_1$ is preferably set to a value that is no less than 1% and no greater than 10% of the threshold voltage $|V_1|$.

When proceeding to step S22, switches SW3 and SW6 are maintained in the ON state, while switches SW1, SW2, SW4, and SW5 are maintained in the OFF state, such that the AC motor 300 continues to be controlled by the overmodulation control unit 104. In contrast, when the absolute value $|V_R|$ of the required voltage amplitude $V_R$ becomes greater than or equal to the threshold voltage $|V_2|$ (shown at point Y in FIG. 7) and the processing proceeds to step S24, switches SW3 and SW6 are switched to the OFF state, switches SW1 and SW4 are switched to the ON state, and switches SW2 and SW5 are maintained in the OFF state, such that the control of the AC motor 300 is transferred from the overmodulation control unit 104 to the rectangular wave voltage phase control unit 106. On the other hand, when the absolute value $|V_R|$ of the required voltage amplitude $V_R$ becomes less than the threshold voltage $|V_1-\alpha_1|$ and the processing proceeds to step S20, switches SW3 and SW6 are switched to the OFF state, switches SW2 and SW5 are switched to the ON state, and switches SW1 and SW4 are maintained in the OFF state, such that the control of the AC motor 300 is transferred from the overmodulation control unit 104 back to the PWM current control unit 102.

In step S16, when the absolute value $|V_R|$ of the required voltage amplitude $V_R$ is greater than or equal to threshold voltage $|V_2-\alpha_2|$, the processing proceeds to step S24, and, when the absolute value $|V_R|$ of the required voltage amplitude $V_R$ is less than the threshold voltage $|V_2-\alpha_2|$, the processing proceeds to step S22. Here, $\alpha_2$ is an offset voltage value having a positive value, and is used to provide a difference between the threshold voltage for transferring from the overmodulation control mode to the rectangular wave voltage phase control mode and the threshold voltage for transferring from the rectangular wave voltage phase control mode to the overmodulation control mode, in order to prevent chattering in the control of the AC motor 300 around the threshold voltage $|V_2|$ between the overmodulation control mode and the rectangular wave voltage phase control mode. For example, $\alpha_2$ is preferably set to a value that is no less than 1% and no greater than 10% of the threshold voltage $|V_2|$.

When proceeding to step S24, switches SW1 and SW4 are maintained in the ON state, while switches SW2, SW3, SW5, and SW6 are maintained in the OFF state, such that the AC motor 300 continues to be controlled by the rectangular wave voltage phase control unit 106. On the other hand, when the absolute value $|V_R|$ of the required voltage amplitude $V_R$ becomes less than the threshold voltage $|V_2-\alpha_2|$ and the processing proceeds to step S22, switches SW1 and SW4 are switched to the OFF state, switches SW3 and SW6 are switched to the ON state, and switches SW2 and SW5 are maintained in the OFF state, such that the control of the AC motor 300 is transferred from the rectangular wave voltage phase control unit 106 back to the overmodulation control unit 104.

Figure 8:
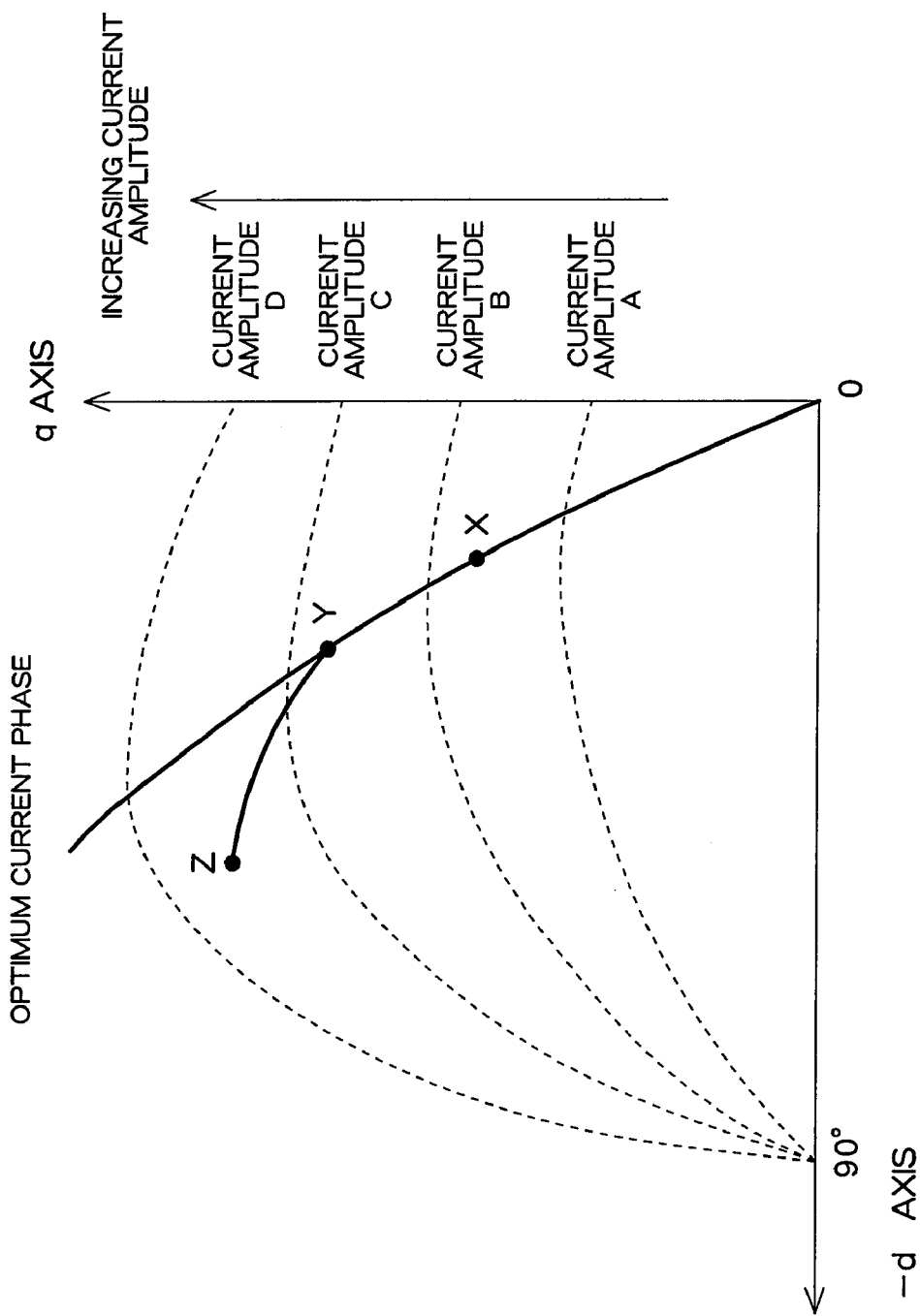
FIG. 8 is a Lissajous diagram showing changes in d-axis current value and q-axis current value according to the embodiment of the present invention.

By performing the processing for switching the control modes of the AC motor 300 using the required voltage amplitude $V_R$ as described above, it is possible to prevent delays in switching from the state of control by the rectangular wave voltage phase control unit 106 (point Z in FIGS. 7 and 8) to the state of control by the overmodulation control unit 104 (segment between point X and point Y in FIGS. 7 and 8), as shown in FIG. 8. Accordingly, the width of deviation of the current supplied to the AC motor 300 from the minimum current phase becomes minimized, thereby suppressing hunting (vibrations). As a result, the drive control of the AC motor 300 can be stabilized.

Figure 9:
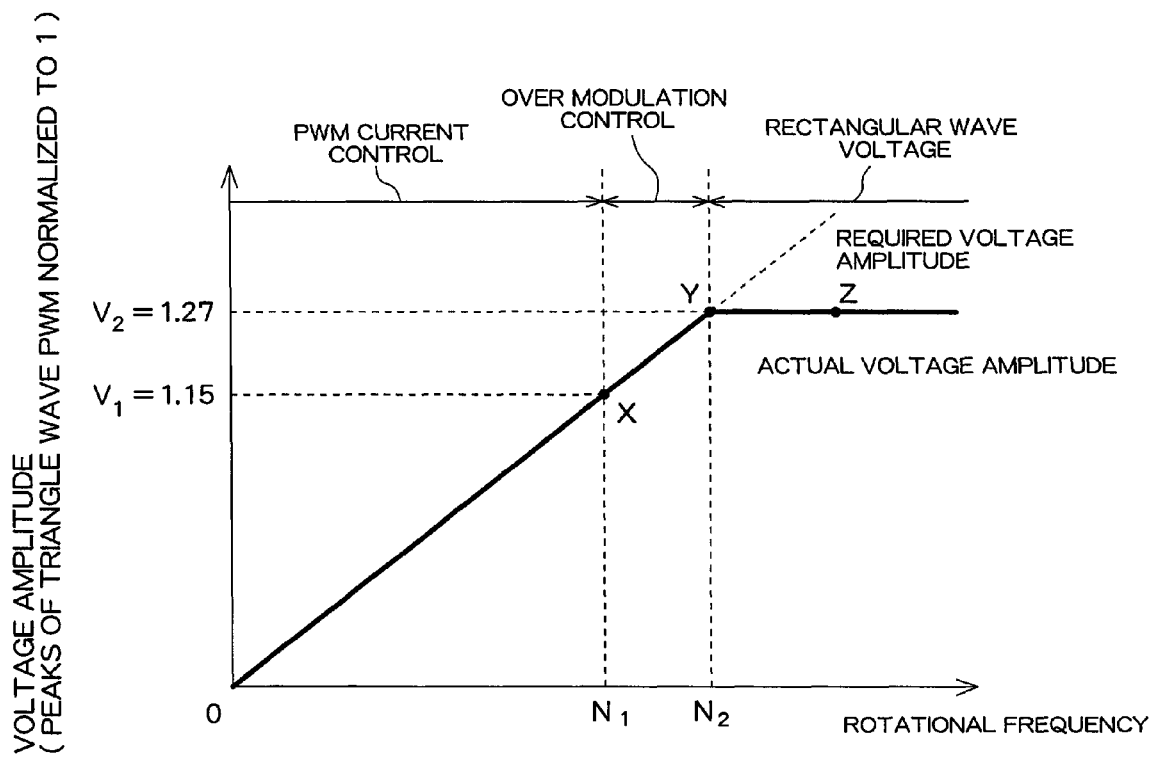
FIG. 9 is a diagram showing the relationship of the rotational frequency and voltage amplitude of the AC motor with respect to the drive control modes according to the embodiment of the present invention.

It should be noted that when modulation including third-order harmonic components is performed in the PWM current control unit 102 and the overmodulation control unit 104, the control threshold voltage $|V_1|$ is preferably set to a value obtained by multiplying the absolute value $|Vc_P|$ of the peak value of the reference triangle wave voltage Vc by 1.15. In this case, the switching of the drive control modes of the AC motor 300 according to the flowchart of FIG. 6 would be as shown in FIG. 9. In FIG. 9, rotational frequency is given by the horizontal axis, while voltage amplitude is given by the vertical axis.

While the present embodiment illustrates using the required voltage amplitude $V_R$ in performing all of the switching of the control modes from the PWM current control unit 102 to the overmodulation control unit 104, from the overmodulation control unit 104 to the rectangular wave voltage phase control unit 106, from the rectangular wave voltage phase control unit 106 to the overmodulation control unit 104, and from the overmodulation control unit 104 to the PWM current control unit 102, the present invention is not limited to this configuration. The present invention may be implemented by using the required voltage amplitude $V_R$ at least in performing the judgment for switching from the rectangular wave voltage phase control unit 106 to the overmodulation control unit 104.

Modified Embodiment

In the above-described embodiment, the control mode judgment unit 108 receives torque command value T* from the current command calculator 110, and calculates power P in accordance with the torque command value T*. In contrast, in the modified embodiment described below, a drive control device 101 that can control an AC motor without using torque command value T* is illustrated.

Figure 10:
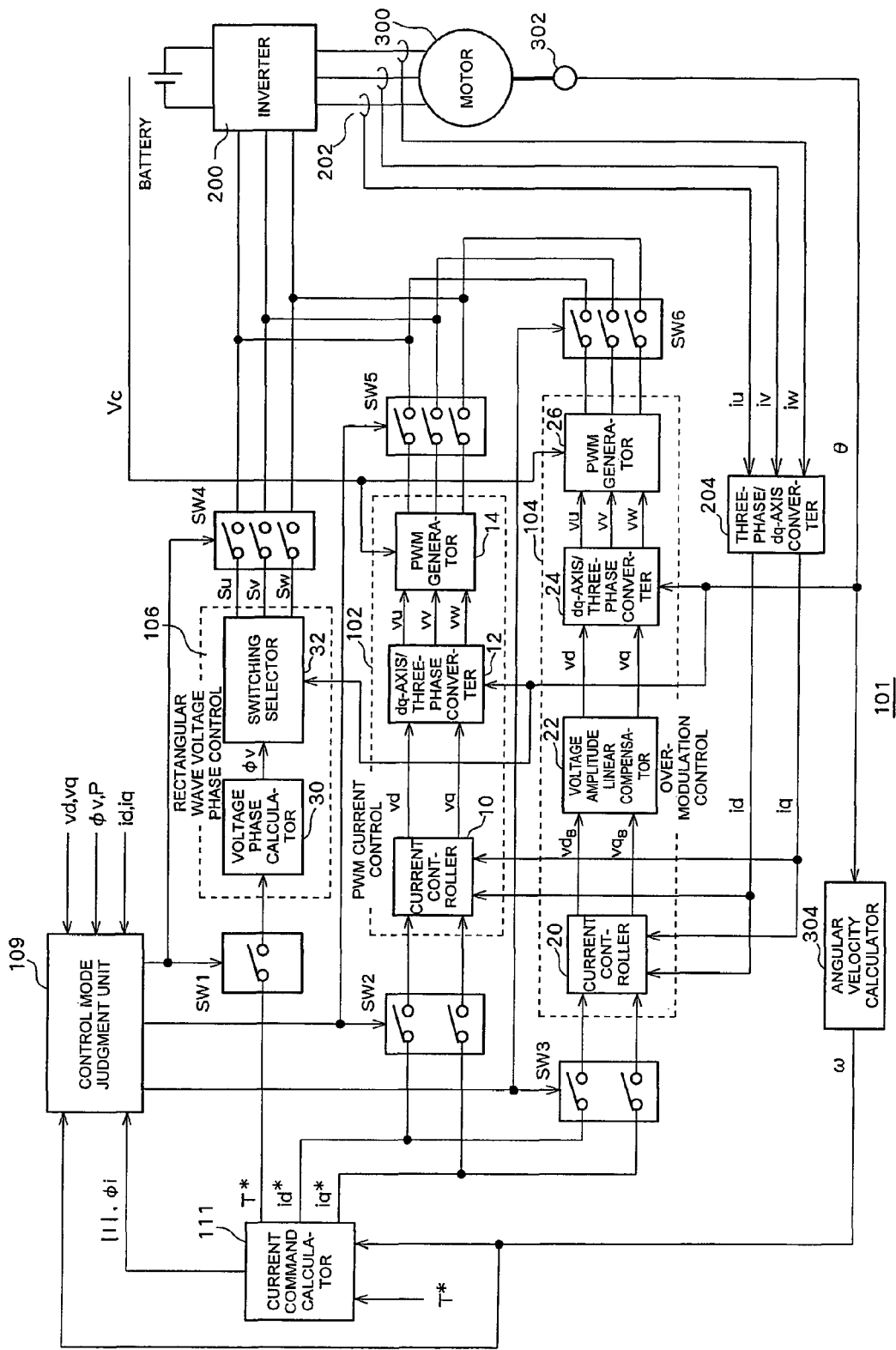
FIG. 10 is a block diagram showing a configuration of an AC motor drive control device according to a variation embodiment of the present invention.
Figure 11:
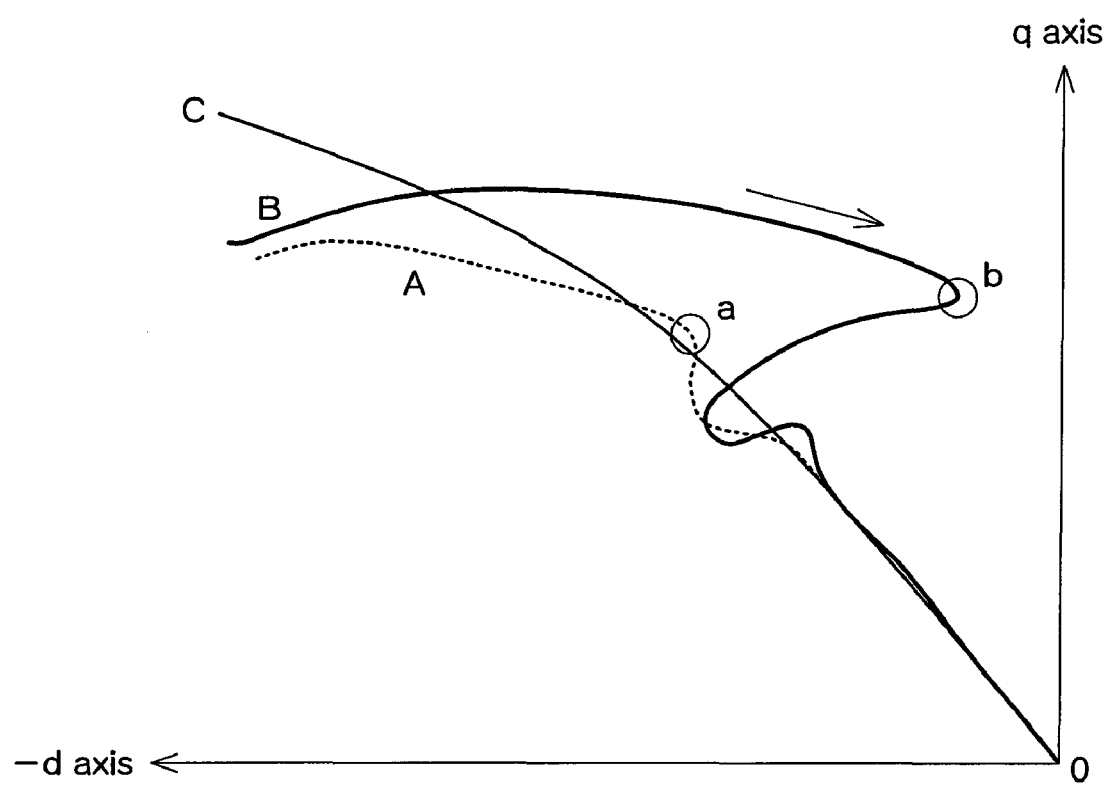
FIG. 11 is a Lissajous diagram showing changes in d-axis current value and q-axis current value according to a conventional AC motor drive control method.

The drive control device 101 is configured as shown in FIG. 10 including PWM current control unit 102, overmodulation control unit 104, rectangular wave voltage phase control unit 106, control mode judgment unit 109, and current command calculator 111. Similarly to in the above-described embodiment, the drive control device 101 is connected to an AC motor 300 via an inverter 200, and controls drive of the AC motor 300 by supplying three-phase electric power to the inverter 200 from one of the PWM current control unit 102, the overmodulation control unit 104, or the rectangular wave voltage phase control unit 106. This modified embodiment has a configuration attained by replacing the control mode judgment unit 108 and the current command calculator 110 in the above-described drive control device 100 with the control mode judgment unit 109 and the current command calculator 111, respectively. Accordingly, the components of the drive control device 101 that are identical to those of the drive control device 100 are labeled with the same reference numerals, and explanations thereof will not be repeated below.

The current command calculator 111 has almost identical functions as the current command calculator 110, but differs in that the current command calculator 111 does not output the externally-input torque command value T* to the control mode judgment unit 109.

The control mode judgment unit 109 does not receive input of the torque command value T* from the current command calculator 111. Instead, the control mode judgment unit 109 receives input of d-axis voltage value vd and q-axis voltage value vq from the current controller 10 of the PWM current control unit 102, uncompensated d-axis voltage value $vd_B$ and q-axis voltage value $vq_B$ from the current controller 20 of the overmodulation control unit 104, d-axis current value id and q-axis current value iq from the three-phase/dq-axis converter 204, and power P from the voltage phase calculator 30 of the rectangular wave voltage phase control unit 106. Based on these received values, the control mode judgment unit 109 obtains power P.

When the control of the AC motor 300 is performed by the PWM current control unit 102, the control mode judgment unit 109 acquires d-axis voltage value vd and q-axis voltage value vq from the current controller 10 of the PWM current control unit 102, as well as d-axis current value id and q-axis current value iq from the three-phase/dq-axis converter 204, and calculates power P according to equation (6) below.

$$P=vd \cdot id+vq \cdot iq \quad (6)$$

When the control of the AC motor 300 is performed by the overmodulation control unit 104, the control mode judgment unit 109 acquires uncompensated d-axis voltage value $vd_B$ and q-axis voltage value $vq_B$ from the current controller 20 of the overmodulation control unit 104, as well as d-axis current value id and q-axis current value iq from the three-phase/dq-axis converter 204, and calculates power P according to equation (7) below.

$$P=vd_B \cdot id+vq_B \cdot iq \quad (7)$$

When the control of the AC motor 300 is performed by the rectangular wave voltage phase control unit 106, the control mode judgment unit 109 directly receives power P from the voltage phase calculator 30 of the rectangular wave voltage phase control unit 106, and uses this received value for control.

When a value for power P is obtained, the control mode judgment unit 109 employs equation (3) to calculate required voltage amplitude $V_R$, and performs the processing for switching the drive control modes of the AC motor 300 similarly to in the above-described embodiment.

While the present modified embodiment illustrates calculating power P using d-axis voltage vd ($vd_B$), q-axis voltage vq ($vq_B$), d-axis current id, and q-axis current iq, it is also possible to calculate power P according to equation (8) below using three-phase voltage vu (U-phase voltage), vv (V-phase voltage), and vw (W-phase voltage) and three-phase current iu (U-phase current), iv (V-phase current), and iw (W-phase current).

$$P=vu \cdot iu+vv \cdot iv+vw \cdot iw \quad (8)$$

Further, in the above-described embodiment and the present modified embodiment, in order to more precisely calculate power P, power loss in the AC motor 300 or the like may be compensated. For example, loss in accordance with a load to be connected to the AC motor 300 may be measured in advance, and a mapping of load and loss may be registered in the control mode judgment unit 108 (109), and this may be used to take into consideration the amount of loss relative to the load, enabling more precise calculation of power P.

The invention claimed is:

1. An AC motor drive control device, comprising:
   a synchronous AC motor;
   an inverter;
   an overmodulation control unit that applies, via the inverter to the synchronous AC motor, a PWM (pulse width modulation) voltage which has a predetermined voltage amplitude and predetermined phase according to a torque command and in which the voltage amplitude exceeds a peak value of a reference triangle wave;
   a rectangular wave voltage phase control unit that controls a phase of a rectangular wave voltage which provides output of one pulse every half a period of an output voltage fundamental wave according to a torque command, and applies the controlled rectangular wave voltage via the inverter to the synchronous AC motor;
   a voltage amplitude calculator that calculates an amplitude of a voltage applied to the synchronous AC motor;
   a required voltage amplitude calculator that calculates a required voltage amplitude required by the synchronous AC motor; and
   a control mode judgment unit that performs a judgment to switch the unit for applying voltage to the synchronous AC motor from the rectangular wave voltage phase control unit to the overmodulation control unit when the required voltage amplitude becomes less than a value obtained by multiplying the peak value of the reference triangle wave by 1.27.

2. The AC motor drive control device as defined in claim 1, further comprising:
   a PWM current control unit that applies, via the inverter to the synchronous AC motor, a PWM (pulse width modulation) voltage having a predetermined voltage amplitude and predetermined phase according to a torque command; wherein
   in a case in which voltages applied to the synchronous AC motor include third-order harmonics,
      the control mode judgment unit performs a judgment to switch the unit for applying voltage to the synchronous AC motor from the PWM current control unit to the overmodulation control unit when the voltage amplitude calculated by the voltage amplitude calculator becomes greater than or equal to a value obtained by multiplying the peak value of the reference triangle wave by 1.15, the control mode judgment unit performs a judgment to switch the unit for applying voltage to the synchronous AC motor from the overmodulation control unit to the rectangular wave voltage phase control unit when the voltage amplitude calculated by the voltage amplitude calculator becomes greater than or equal to a value obtained by multiplying the peak value of the reference triangle wave by 1.27, and the control mode judgment unit performs a judgment to switch the unit for applying voltage to the synchronous AC motor from the overmodulation control unit to the PWM control unit when the voltage amplitude calculated by the voltage amplitude calculator becomes less than a value obtained by multiplying the peak value of the reference triangle wave by 1.15.

3. The AC motor drive control device as defined in claim 2, wherein the control mode judgment unit performs a judgment to switch the unit for applying voltage to the synchronous AC motor from the overmodulation control unit to the PWM current control unit when the voltage amplitude calculated by the voltage amplitude calculator becomes less than a value obtained by subtracting an offset value $\alpha_1$ from the value obtained by multiplying the peak value of the reference triangle wave by 1.15.

4. The AC motor drive control device as defined in claim 1, further comprising:

a PWM current control unit that applies, via the inverter to the synchronous AC motor, a PWM (pulse width modulation) voltage having a predetermined voltage amplitude and predetermined phase according to a torque command; wherein in a case in which voltages applied to the synchronous AC motor do not include third-order harmonics, the control mode judgment unit performs a judgment to switch the unit for applying voltage to the synchronous AC motor from the PWM current control unit to the overmodulation control unit when the voltage amplitude calculated by the voltage amplitude calculator becomes greater than or equal to the peak value of the reference triangle wave, the control mode judgment unit performs a judgment to switch the unit for applying voltage to the synchronous AC motor from the overmodulation control unit to the rectangular wave voltage phase control unit when the voltage amplitude calculated by the voltage amplitude calculator becomes greater than or equal to a value obtained by multiplying 1.27 to the peak value of the reference triangle wave, and the control mode judgment unit performs a judgment to switch the unit for applying voltage to the synchronous AC motor from the overmodulation control unit to the PWM control unit when the voltage amplitude calculated by the voltage amplitude calculator becomes less than the peak value of the reference triangle wave.

5. The AC motor drive control device as defined in claim 4, wherein the control mode judgment unit performs a judgment to switch the unit for applying voltage to the synchronous AC motor from the overmodulation control unit to the PWM current control unit when the voltage amplitude calculated by the voltage amplitude calculator becomes less than a value obtained by subtracting an offset value $\alpha_1$ from the peak value of the reference triangle wave.

6. The AC motor drive control device as defined in claim 1, further comprising:

a PWM current control unit that applies, via the inverter to the synchronous AC motor, a PWM (pulse width modulation) voltage having a predetermined voltage amplitude and predetermined phase according to a torque command; wherein in a case in which voltages applied to the synchronous AC motor include third-order harmonics, the control mode judgment unit performs a judgment to switch the unit for applying voltage to the synchronous AC motor from the PWM current control unit to the overmodulation control unit when the required voltage amplitude becomes greater than or equal to a value obtained by multiplying the peak value of the reference triangle wave by 1.15, the control mode judgment unit performs a judgment to switch the unit for applying voltage to the synchronous AC motor from the overmodulation control unit to the rectangular wave voltage phase control unit when the required voltage amplitude becomes greater than or equal to a value obtained by multiplying the peak value of the reference triangle wave by 1.27, and the control mode judgment unit performs a judgment to switch the unit for applying voltage to the synchronous AC motor from the overmodulation control unit to the PWM control unit when the required voltage amplitude becomes less than a value obtained by multiplying the peak value of the reference triangle wave by 1.15.

7. The AC motor drive control device as defined in claim 6, wherein the control mode judgment unit performs a judgment to switch the unit for applying voltage to the synchronous AC motor from the overmodulation control unit to the PWM current control unit when the required voltage amplitude becomes less than a value obtained by subtracting an offset value $\alpha_1$ from the value obtained by multiplying the peak value of the reference triangle wave by 1.15.

8. The AC motor drive control device as defined in claim 1, further comprising:

a PWM current control unit that applies, via the inverter to the synchronous AC motor, a PWM (pulse width modulation) voltage having a predetermined voltage amplitude and predetermined phase according to a torque command; wherein in a case in which voltages applied to the synchronous AC motor do not include third-order harmonics, the control mode judgment unit performs a judgment to switch the unit for applying voltage to the synchronous AC motor from the PWM current control unit to the overmodulation control unit when the required voltage amplitude becomes greater than or equal to the peak value of the reference triangle wave, the control mode judgment unit performs a judgment to switch the unit for applying voltage to the synchronous AC motor from the overmodulation control unit to the rectangular wave voltage phase control unit when the required voltage amplitude becomes greater than or equal to a value obtained by multiplying the peak value of the reference triangle wave by 1.27, and the control mode judgment unit performs a judgment to switch the unit for applying voltage to the synchronous AC motor from the overmodulation control unit to the PWM control unit when the required voltage amplitude becomes less than the peak value of the reference triangle wave.

9. The AC motor drive control device as defined in claim 8, wherein the control mode judgment unit performs a judgment to switch the unit for applying voltage to the synchronous AC motor from the overmodulation control unit to the PWM current control unit when the required voltage amplitude becomes less than a value obtained by subtracting an offset value $\alpha_1$ from the peak value of the reference triangle wave.

10. The AC motor drive control device as defined in claim 1, wherein the control mode judgment unit performs a judgment to switch the unit for applying voltage to the synchronous AC motor from the rectangular wave voltage phase control unit to the overmodulation control unit when the required voltage amplitude required by the synchronous AC motor becomes less than a value obtained by subtracting an offset value $\alpha_2$ from the value obtained by multiplying the peak value of the reference triangle wave by 1.27.

11. The AC motor drive control device as defined in claim 1, wherein the required voltage amplitude calculator calculates the required voltage amplitude by performing a calculation according to (power P supplied to the synchronous AC motor)/(current amplitude supplied to the synchronous AC motor×power factor of power supplied to the synchronous AC motor).

* * * * *

UNITED STATES PATENT AND TRADEMARK OFFICE
CERTIFICATE OF CORRECTION

PATENT NO. : 8,018,195 B2
APPLICATION NO. : 12/305713
DATED : September 13, 2011
INVENTOR(S) : Hiroki Ohtani et al.

It is certified that error appears in the above-identified patent and that said Letters Patent is hereby corrected as shown below:

In the Title page, after the title, after "(75) Inventors:" change

"Hiroki Ohtani, Aichi-ken (JP);" to

--Hiroki Ohtani, Aichi-gun (JP);--.

| Column | Line | |
|---|---|---|
| 5 | 31 | Change "current phase angle i$\phi$" to --current phase angle $\phi$i-- |
| 5 | 36 | Change "current phase angle i$\phi$" to --current phase angle $\phi$i-- |
| 5 | 40 | Change "i$\phi$ of the d-axis" to --$\phi$i of the d-axis-- |
| 5 | 54 | Change "i$\phi$ of the current" to --$\phi$i of the current--. |

Signed and Sealed this
Twenty-fourth Day of April, 2012

David J. Kappos
*Director of the United States Patent and Trademark Office*